US008981021B2

(12) United States Patent
Eisinger et al.

(10) Patent No.: US 8,981,021 B2
(45) Date of Patent: Mar. 17, 2015

(54) SYSTEMS AND METHODS FOR FABRICATING POLYOLEFINS (75) Inventors: Ronald S. Eisinger, Charleston, WV (US); Mark G. Goode, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 703 days.

(21) Appl. No.: 12/531,418

(22) PCT Filed: Feb. 21, 2008

(86) PCT No.: PCT/US2008/002311
§ 371 (c)(1),
(2), (4) Date: Sep. 15, 2009

(87) PCT Pub. No.: WO2008/121187
PCT Pub. Date: Oct. 9, 2008

(65) Prior Publication Data
US 2010/0105849 A1 Apr. 29, 2010

Related U.S. Application Data (60) Provisional application No. 60/920,998, filed on Mar. 30, 2007.

(51) Int. Cl.
*C08F 2/00* (2006.01)
*C08F 2/38* (2006.01)
*C08F 4/24* (2006.01)
*C08F 210/16* (2006.01)

(52) U.S. Cl.
CPC .................................. *C08F 210/16* (2013.01)

USPC ................................ 526/84; 526/74; 526/106

(58) Field of Classification Search
CPC ................. C08F 2/00; C08F 2/38; C08F 4/24
USPC ........................................ 526/68, 74, 84, 106
See application file for complete search history.

(56) References Cited

U.S. PATENT DOCUMENTS

| 4,482,687 | A | * | 11/1984 | Noshay et al. .............. 526/124.4 |
| 4,543,399 | A | * | 9/1985 | Jenkins et al. .................. 526/70 |
| 4,739,015 | A | | 4/1988 | Toyota et al. .................. 525/270 |
| 5,034,479 | A | | 7/1991 | Eisinger et al. .................. 526/68 |
| 5,137,994 | A | | 8/1992 | Goode et al. .................... 526/75 |
| 5,244,987 | A | | 9/1993 | Bernard et al. .................. 526/78 |

(Continued)

FOREIGN PATENT DOCUMENTS

| CN | 96111424 | 1/2001 |
| CN | 97106144.0 | 12/2002 |

(Continued)

OTHER PUBLICATIONS

Boreskov, G.K. et al. "Impact of Water and Oxygen on the Ethylene Polymerization on the Chrome Oxide Catalyst" Dokl. AN SSSR, 1961, vol. 136, No. 1 p. 125-128.

*Primary Examiner* — David W Wu
*Assistant Examiner* — Elizabeth Eng
(74) *Attorney, Agent, or Firm* — Kristina Leavitt (57) ABSTRACT Various methods and systems for using oxygen in a polyolefin polymerization reactor system are provided. In certain embodiments, the methods are performed in conjunction with a polymerization reactor system such as a gas-phase reactor system.

10 Claims, 2 Drawing Sheets

(56) References Cited

U.S. PATENT DOCUMENTS

| | | | |
|---|---|---|---|
| 5,306,792 A | 4/1994 | Havas et al. | |
| 5,385,991 A | 1/1995 | Yamaguchi et al. | 526/74 |
| 5,410,002 A | 4/1995 | Govoni et al. | 526/88 |
| 5,473,027 A | 12/1995 | Batchelor et al. | 526/106 |
| 5,844,054 A | 12/1998 | Samples et al. | 526/60 |
| 6,022,933 A * | 2/2000 | Wright et al. | 526/68 |
| 6,088,934 A | 7/2000 | Newton | |
| 6,180,729 B1 | 1/2001 | Lange et al. | 526/74 |
| 6,429,269 B1 | 8/2002 | Leaney | 526/82 |
| 6,584,610 B1 | 6/2003 | Wu et al. | 716/19 |
| 6,649,709 B1 | 11/2003 | Bauer et al. | 526/88 |
| 6,664,352 B1 | 12/2003 | Fredriksen et al. | 526/160 |
| 6,891,001 B2 * | 5/2005 | Kuhlburger | 526/68 |
| 6,936,666 B2 | 8/2005 | Mihan et al. | 526/68 |
| 6,989,344 B2 * | 1/2006 | Cann et al. | 502/150 |
| 2005/0054790 A1 | 3/2005 | Mawson et al. | 526/115 |
| 2005/0085600 A1 | 4/2005 | Ehrman et al. | 526/114 |
| 2005/0154168 A1 | 7/2005 | Shannon et al. | |
| 2005/0267269 A1 | 12/2005 | Hagerty et al. | 526/68 |
| 2006/0223958 A1 * | 10/2006 | Fischbuch | 526/68 |

FOREIGN PATENT DOCUMENTS

| | | |
|---|---|---|
| EP | 0927724 B1 | 5/2006 |
| RU | 2053 839 C1 | 2/1996 |
| RU | 2053839 | 2/1996 |
| WO | WO 94/28032 | 12/1994 |
| WO | WO 99/29736 | 6/1999 |
| WO | WO 01/49751 | 7/2001 |
| WO | WO 2006/107373 | 10/2006 |
| WO | WO 2006107373 A1 * | 10/2006 |

* cited by examiner

SYSTEMS AND METHODS FOR FABRICATING POLYOLEFINS

CROSS-REFERENCE TO RELATED APPLICATIONS

This application is a National Stage application under 36 U.S.C. §371 of International Application No. PCT/US2008/002311, filed Feb. 21, 2008, that claims the benefit of Ser. No. 60/920,998, filed Mar. 30, 2007, the disclosures of which are incorporated by reference in their entireties.

FIELD OF THE INVENTION

The present invention relates to various methods and systems for using oxygen in a polyolefin polymerization reactor system. In certain embodiments, the methods are performed in conjunction with a polymerization reactor system such as a gas-phase reactor system.

BACKGROUND

In the gas phase process for production of polyolefins such as polyethylene, a gaseous alkene (e.g., ethylene), hydrogen, optionally a co-monomer and other raw materials are converted to polyolefin product. Generally, gas phase reactors include a fluidized bed reactor, a compressor, and a cooler (heat exchanger). The reaction is maintained in a two-phase fluidized bed of granular polyethylene and gaseous reactants by the fluidizing gas which is passed through a distributor plate near the bottom of the reactor vessel. The reactor vessel is normally constructed of carbon steel and rated for operation at pressures up to about 31 bars (or about 3.1 MPa). Catalyst is injected into the fluidized bed. Heat of reaction is transferred to the circulating gas stream. This gas stream is compressed and cooled in the external recycle line and then is reintroduced into the bottom of the reactor where it passes through a distributor plate. Make-up feedstreams are added to maintain the desired reactant concentrations to provide for a continuous polymerization process.

Operation of most reactor systems is critically dependent upon good mixing for uniform reactor conditions, heat removal, and effective catalyst performance. The process must be controllable, and capable of a high production rate. In general, the higher the operating temperature, the greater the capability to achieve high production rate. However, as the operating temperature approaches and exceeds the melting point of the polyolefin product, the particles of polyolefin become tacky and melt. The next event is an interplay of forces which results in particles agglomerating with adjacent particles. The net result is the formation of fused sheets of polymer along the vessel wall and along other parts of the reactor system. Progressive cycles in this process may eventually result in the growth of the sheet and its falling into the fluid bed. These sheets interrupt fluidization, circulation of gas and withdrawal of the product from the reactor, requiring a reactor shutdown for removal.

Similarly, accumulation of resin at the cooler results in a progressively decreasing cooling efficiency, which can eventually lead to elevated operating temperatures and the aforementioned problems. For reasons not completely understood, the use of certain catalysts has been found to create resin accumulations in the system, particularly at the cooler.

The selection of the catalyst also greatly affects the overall process. Among available catalysts for the polymerization of polyolefins are chromium containing catalysts such as chromium oxide based catalyst systems. Such catalysts have been used and are of importance, especially for the production of high density polyethylene. In particular, these catalyst are of special importance in, for example, blow molding, film, and pipe applications. (See, e.g., U.S. Pat. Nos. 4,739,015, 5,244,987, 5,385,991, 6,022,933, 6,429,269, 6,891,001, 6,936,666, and 6,989,344, and EP 0 927 724 B1. See also, U.S. Pat. Nos. 5,410,002, 5,844,054, 6,180,729, 6,664,352, U.S. Patent Application Publication Nos. 2005/0054790 and 2005/0267269, and Chinese Patent Application Nos. CN96111424.X and CN97106144.0.) Other background references include WO 2006/107373 and WO 2001/49751.

Accordingly, it would be desirable to provide for an improved polymerization process utilizing chromium containing catalysts and other materials such as, for example, oxygen and organo aluminum compounds.

SUMMARY

The present invention is broadly directed to various methods and systems for production of polyolefins such as polyethylene. In certain embodiments, the methods are performed in conjunction with a polymerization reactor system such as a gas-phase reactor system. The invention is also broadly directed to various systems in which fouling may occur.

A reactor system for producing a polyolefin according to one embodiment of the present invention includes a reactor vessel having therein a chromium oxide-based catalyst that has been reduced with diethyl aluminum ethoxide (DEAlE), a monomer feed line for adding a monomer to the reactor system, a flow meter on the monomer feed line, an oxygen supply line for adding oxygen to the reactor system, and a processing unit in communication with the flow meter for controlling a feed rate of the oxygen based on an output of the flow meter. The oxygen is fed to the fluidized bed reactor system at a rate equivalent to about or less than 0.1 parts per million of oxygen relative to a volumetric rate of the monomer added to the fluidized bed reactor system in a class of embodiments.

In a method for producing a polyolefin according to one embodiment, an optimum operating temperature for producing a polyolefin in a fluidized bed reactor system is determined. A chromium oxide-based catalyst that has been reduced with diethyl aluminum ethoxide (DEAlE) is selected based on desired properties of the polyolefin achieved at the operating temperature. Monomers are contacted with the catalyst in the fluidized bed reactor system. A recycle stream of the fluidized bed reactor system is cooled in order to maintain the optimum operating temperature. Oxygen is fed to the fluidized bed reactor system to maintain in the fluidized bed reactor system about a minimum effective amount of oxygen necessary to minimize fouling of the fluidized bed reactor system.

A method for producing polyethylene, according to one embodiment, includes determining an optimum operating temperature for producing polyethylene in a fluidized bed reactor system, the optimum operating temperature being such that a highest temperature in the fluidized bed reactor system is about or less than about 20° C. below a melting point of the polyethylene. A catalyst is fed to the fluidized bed reactor system, the catalyst being a chromium oxide-based catalyst that has been reduced with diethyl aluminum ethoxide (DEAlE). Ethylene optimally with a comonomer such as hexene or butene is contacted with the catalyst in the fluidized bed reactor system. A recycle stream of the fluidized bed reactor system is cooled for maintaining about the optimum operating temperature. Oxygen is fed to the fluidized bed reactor system at a rate equivalent to about or less than 0.1 parts per million of oxygen relative to a volumetric rate of the ethylene added to the fluidized bed reactor system.

A method for reducing fouling in a fluidized bed polymerization reactor system according to yet another embodiment includes feeding a chromium oxide-based catalyst that has been reduced with diethyl aluminum ethoxide (DEAlE) to a fluidized bed reactor system, contacting monomers with the catalyst in the fluidized bed reactor system to create a polymer, and feeding oxygen to the fluidized bed reactor system at a rate equivalent to greater than 0 and less than 0.1 parts per million of oxygen relative to a volumetric rate of the monomer added to the fluidized bed reactor system for the purpose of minimizing fouling of the fluidized bed reactor system.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

It has surprisingly been found that the continuous introduction of a small quantity of oxygen reduces fouling in gas phase fluidized bed reactors used for ethylene polymerization with chromium-oxide-based catalysts reduced with diethyl aluminum ethoxide (DEAlE). The amount of oxygen needed is small enough to have negligible effect on product properties and catalyst productivity. This finding allows polymerization to be carried out for longer periods without having to stop production and open the reactor for cleaning. It is believed that this finding extends beyond the production of polyethylene and/or production of polyolefins in a gas-phase fluidized bed reactor with chromium-oxide-based catalysts reduced with DEAlE.

While the present invention is applicable to gas phase polyolefin production, the broad concepts and teachings herein may also have applicability to many types of processes, including but not limited to, gas phase, gas/solid phase, liquid/solid phase, gas/liquid phase, and gas/liquid/solid phase reactor systems including polymerization reactor systems.

For ease of understanding of the reader, as well as to place the various embodiments of the invention in a context, much of the following description shall be presented in terms of a commercial, gas phase polyethylene reactor system. It should be kept in mind that this is done by way of non-limiting example only.

Figure 1:
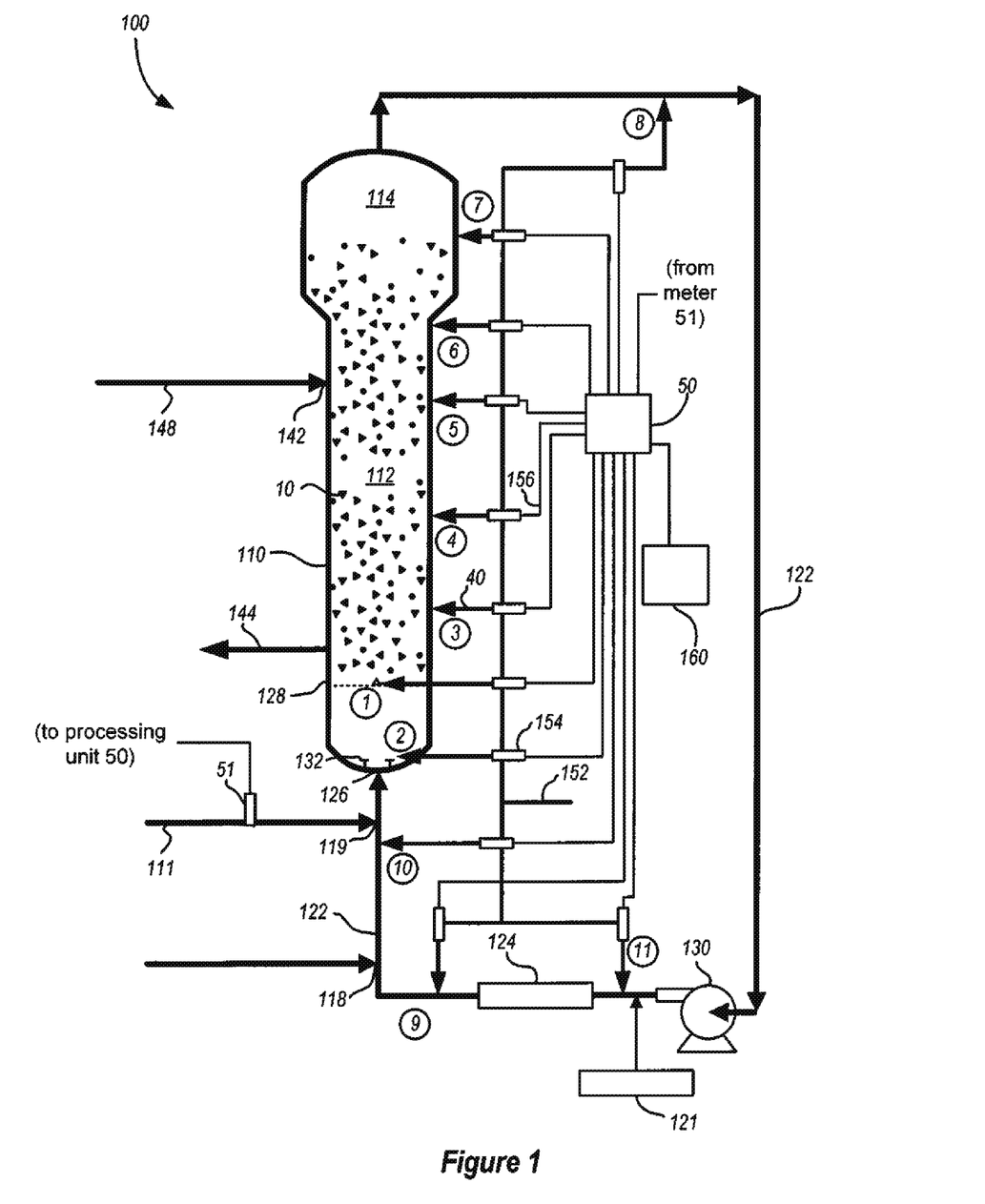
FIG. 1 is a schematic representation of the general methods, systems and/or apparatus of certain embodiments of the invention illustrating implementation in a fluidized bed polymerization reactor system.

A general method of the invention can be described, for example, with reference to FIG. 1, in which a bulk material 10 is present in a fluidized bed polymerization reactor system 100. Such bulk material can be gaseous, liquid, and/or solid material. In a reactor system, illustrative bulk materials may include one or more of reaction raw materials such as feedstocks, reaction products such as polymer particles, reaction adjuncts such as catalysts, reaction byproducts, etc., and other materials. Thus, the bulk material may include substantially pure individual materials as well as combinations of materials, the material(s) being present in one or more phases. An optimum operating temperature for producing a polyolefin in the fluidized bed reactor system is selected. A chromium oxide-based catalyst that has been reduced with DEAlE is selected based on one or more desired properties of the polyolefin achieved at the selected operating temperature. Monomers are contacted with the catalyst in the fluidized bed reactor system 100. A recycle stream in a recycle line 122 of the fluidized bed reactor system 100 is cooled in order to maintain the optimum operating temperature. Oxygen is fed to the fluidized bed reactor system via one or more oxygen feed lines 40 to maintain in the fluidized bed reactor system about a minimum effective amount of oxygen that minimizes fouling of the fluidized bed reactor system 100. In a class of embodiments, fouling can be considered to be minimized if the reactor system can operate at least about 3 months without requiring opening of the reactor system for cleaning. In preferred embodiments, fouling is considered minimized if the reactor system can operate 6 months, 9 months, 1 year, or 2 years without requiring opening of the reactor system for cleaning.

In another preferred general approach of the general method described, for example, with reference to FIG. 1, a method for producing polyethylene includes determining an optimum operating temperature for producing polyethylene in a fluidized bed reactor system 100, the optimum operating temperature being such that the highest temperature in the fluidized bed reactor system 100 is less than about 20° C. below the melting point of polyethylene. A catalyst is fed to the fluidized bed reactor system 100, the catalyst being a chromium oxide-based catalyst that has been reduced with DEAlE. Monomers are contacted with the catalyst in the fluidized bed reactor system 100. A recycle stream of the fluidized bed reactor system is cooled in order to maintain the optimum operating temperature. Oxygen is fed to the fluidized bed reactor system 100 at a rate equivalent to about or less than 0.1 parts per million of oxygen relative to a volumetric rate of the monomer added to the fluidized bed reactor system 100.

Further details of fluidized bed polymerization reactor systems including specific materials used in the fabrication are described below, and each of the below-described details are specifically considered in various combination with these and other generally preferred approaches described herein.

In another preferred general approach of the general method, a catalyst is fed to a fluidized bed reactor system. Monomers are contacted with the catalyst in the fluidized bed reactor system to produce polymer products. Oxygen is fed to the fluidized bed reactor system at a rate equivalent to about or less than 0.1 parts per million of oxygen relative to a volumetric rate of the monomer added to the fluidized bed reactor system for the purpose of minimizing fouling of the fluidized bed reactor system.

The present invention also includes devices and systems effective for producing polyolefins according to the aforementioned methods. In general, such devices are systems or apparatus that comprise one or more oxygen feeds lines into a fluidized bed polymerization reactor system.

A preferred general system of the invention includes a reactor vessel 110 (also referred to interchangeably herewith as a reaction vessel), and may include a recycle line 122. The reactor vessel 110 has therein a chromium oxide-based catalyst that has been reduced with diethylaluminum ethoxide (DEAlE). A monomer feed line 111 is coupled to the reactor system for adding a monomer to the reactor system. A flow meter 51 is present on the monomer feed line 111. An oxygen supply line 40 is coupled 156 to the system for adding oxygen to the reactor system. A processing unit 50 is in communication with the flow meter 51 for controlling a feed rate of the oxygen based on an output of the flow meter. In one aspect, the oxygen is fed to the fluidized bed reactor system at a rate equivalent to about or less than 0.1 parts per million of oxygen relative to a volumetric rate of the monomer added to the fluidized bed reactor system.

Addition of Oxygen to Polymerization Reactor Systems

The amount of oxygen needed to obtain the benefits of the invention is a small amount. This finding allows polymerization to be carried out for longer periods without having to stop production and open the reactor for cleaning. It is believed that this finding extends beyond the production of ethylene and/or production of polyolefins in a gas-phase fluidized bed reactor with chromium oxide-based catalysts reduced with DEAlE.

In each of the aforementioned generally preferred approaches and/or embodiments, oxygen may be added to reduce fouling in a variety of processes, including but not limited to, gas phase, gas/solid phase, liquid/solid phase, gas/liquid phase, and gas/liquid/solid phase reactor systems including polymerization reactor systems.

One or more oxygen feed lines (designated generally collectively using the reference numeral "40," with multiple oxygen feed lines designated more specifically in the various figures as feed lines with circled numbers 1, 2, 3, etc. and in the associated text herein as 40-1, 40-2, 40-3, etc.) are coupled to the reactor system 100. The amount of oxygen added is preferably about a minimum effective amount of oxygen necessary to minimize fouling of the fluidized bed reactor system.

Fouling

Figure 2:
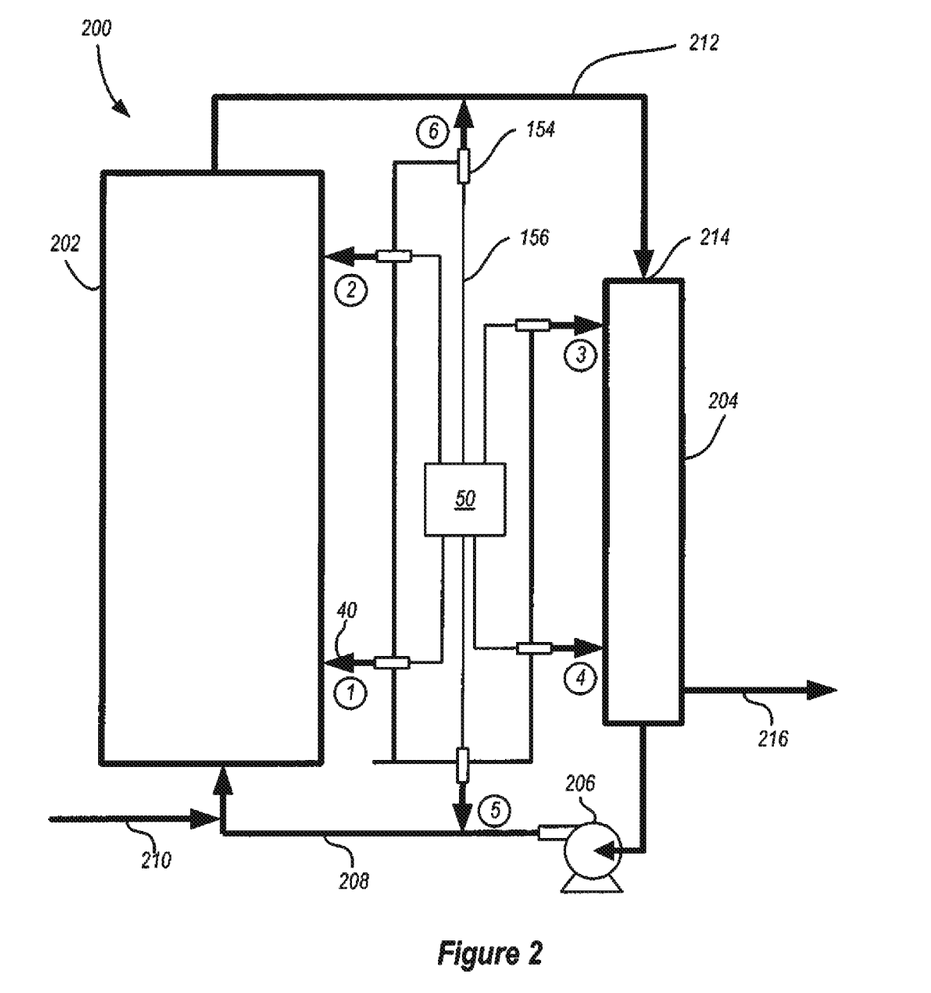
FIG. 2 is a schematic representation of the general methods, systems and/or apparatus of certain embodiments of the invention illustrating implementation in a fluidized bed polymerization reactor system.

Fouling in a reactor system such as that shown in FIGS. 1 and 2 is problematic for several reasons. Fouling of the heat exchanger causes reduced cooling efficiency. Fouling of sensors employed to measure temperature, pressure, flow rate, etc. interferes with sensor operations. Fouling at the distributor plate affects the formation and maintenance of the fluidized bed.

Fouling is particularly problematic at the heat exchanger, which is primarily responsible for maintaining the operating temperature. If the heat exchanger becomes fouled, it becomes less efficient, sometimes requiring a slowing of the production rate to lower heat generation in the reactor vessel. If the fouling is severe, the heat exchanger may fail to adequately cool the materials flowing through it and may allow the temperatures in the system to surpass the melting point of the polymer product. If the temperature surpasses the melting point of the polymer product, referred to as "resin," the resin becomes tacky and forms agglomerates, sheeting, and additional fouling. Agglomerates adversely affect the fluidized bed by disrupting flow. Sheeting along the reactor vessel wall may collapse and cause the bed to collapse, requiring a costly shutdown of the reactor system.

Fouling in shell and tube heat exchangers on the plate or "tube sheet" at the inlet to the tube array, as well as accumulations in the tubes have been observed in a fluidized bed reactor system producing polyethylene with a chromium oxide-based catalyst that has been reduced with DEAlE.

In a class of embodiments, it has surprisingly been found that the introduction of a small amount of oxygen in a fluidized bed reactor system creating polyethylene reduces or eliminates fouling, particularly in the heat exchanger of a fluidized bed polyethylene reactor system such as that shown in FIG. 1, and is able to do so without significantly affecting product properties or catalyst productivity. Oxygen in a fluidized bed polymerization system tends to function as a catalyst "poison" that reduces production rates and terminates polymerization, generally resulting in a lower molecular weight of the polymer product. Therefore, the introduction of oxygen is typically avoided in polyolefin production processes where high production rates or higher molecular weight product is desired.

One approach takes this surprising finding and expands it to allow production of polyolefins with high molecular weights and broad molecular weight distributions by careful selection of catalyst properties and operating conditions, as set forth more fully below.

Polymerization Reactor Systems

In each of the aforementioned generally preferred approaches and/or embodiments, a fluidized bed system may include a fluidized bed polymerization reactor system. As briefly noted above, gas phase polymerization reactions may be carried out in fluidized bed polymerization reactors, and may also be formed in stirred or paddle-type reaction systems (e.g., stirred bed systems) which include solids in a gaseous environment. While the following discussion will feature fluidized bed systems, it is to be understood that the general concepts relating to the addition of oxygen to reduce or eliminate fouling, which are discussed relevant to the fluidized bed systems, are also adaptable to the stirred or paddle-type reaction systems as well. The present invention is not limited to any specific type of gas phase reaction system.

In very general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the recycle stream or reactor vessel, to replace the polymerized monomer. See, for example, U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847. A basic, conventional fluidized bed system is illustrated in FIG. 1. The reactor vessel 110 comprises a reaction zone 112 and a velocity reduction zone 114. While a reactor configuration comprising a generally cylindrical region beneath an expanded section is shown in FIG. 1, alternative configurations such as a reactor configuration comprising an entirely or partially tapered reactor may also be utilized. In such configurations, the fluidized bed may be located within a tapered reaction zone but below a region of greater cross-sectional area which serves as the velocity reduction zone of the more conventional reactor configuration shown in FIG. 1.

In general, the height to diameter ratio of the reaction zone can vary in the range of about 1:1 to about 10:1. The cross-sectional area of the velocity reduction zone 114 is typically within the range of from about 2 to about 4 multiplied by the cross-sectional area of the reaction zone 112.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/s for polyolefins. Preferably, the superficial gas velocity is at least 0.2 ft/s above the minimum flow for fluidization or from about 0.4 to about 0.7 ft/s. Ordinarily, the superficial gas velocity will not exceed 5.0 ft/s and is usually no more than about 2.5 ft/s.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed consisting of desired polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of dense mass of individually moving particles as created by the percolation of gas through the bed. The pressure drop through the bed is equal to or slightly greater than the weight of the bed divided by the cross-sectional area.

Referring again to FIG. 1, make-up fluids can be fed at points 118 and 119 via recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 downstream of the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover.

The recycle stream is then compressed in compressor 130 and passed through heat exchanger 124 where the heat of reaction is removed from the recycle stream before it is returned to the bed. Note that the heat exchanger 124 may also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

In accordance with an embodiment of the present invention, the polymerization catalyst enters the reactor in solid or liquid form at a point 142 through line 148. If the catalyst requires the use of one or more co-catalysts, as is often the case, the one or more cocatalysts may be introduced separately into the reaction zone where they will react with the catalyst to form the catalytically active reaction product. However the catalyst and cocatalyst(s) may be mixed prior to their introduction into the reaction zone.

The reactor shown in FIG. 1 is particularly useful for forming polyolefins such as polyethylene, polypropylene, etc. Process conditions, raw materials, catalysts, etc. for forming various polyolefins and other reaction products are found in the references incorporated herein. Illustrative process conditions for polymerization reactions in general are listed below to provide general guidance.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 125° C. In one approach, the highest temperature in the reactor system is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 120° C. to 136° C.

In one approach, the temperature at the point of highest temperature in the reactor system is less than about 30° C., more preferably less than about 20° C., and even more preferably less than about 15° C. below the melting point of the polyolefin being produced. In a system such as that shown in FIG. 1, the point of highest temperature is typically at the outlet of the compressor 130.

Other gas phase processes contemplated include series or multistage polymerization processes. Also gas phase processes contemplated by the invention include those described in U.S. Pat. Nos. 5,627,242, 5,665,818 and 5,677,375, and EP-A-0 794 200, EP-B1-0 649 992, EP-A-0 802 202, and EP-B-634 421.

In any of the embodiments described herein, the gas phase process may be operated in a condensing mode, where an inert condensable fluid is introduced to the process to increase the cooling capacity of the reactor system. These inert condensable fluids are referred to as induced condensing agents or ICA's. For further details of condensing mode processes see U.S. Pat. Nos. 5,342,749 and 5,436,304.

In certain embodiments of the invention, it is contemplated that commercial reactors capable of producing greater than 500 lbs of polymer per hour (227 Kg/hr) to about 300,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr) may be employed.

Another illustrative fluidized bed polymerization reactor system 200 is shown in FIG. 2. As shown, the system 200 is a recirculating system including a fast riser 202, a downcomer 204, and a recirculating pump 206. The monomer(s) and catalyst are added to recycle line 208 via feed 210. In this type of system, the polymerization product is formed primarily in the fast riser 202, but continues to form throughout the system. Polymer particles formed in the fast riser 202 pass through line 212 to an upper inlet port 214 of the downcomer 204. The polymer particles gather in the downcomer, where they move downwardly in a dense, slow moving bed. The bed formed in the downcomer, in a class of embodiments, may be considered a fluidized bed. Particulate polymer product is discharged from line 216. Although not shown, it is desirable to separate any fluid from the product and to return the fluid to the reactor system 200.

Other Polymerization Systems

Slower moving masses of particles, while considered "fluidized" for purposes of the invention, are also referred to in the art as "moving beds." Moving beds include particles in such things as mass flow bins, downcomers, etc. where solids are slowly moving through a vessel.

Stirred bed system, while considered "fluidized" for purposes of the invention, include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

In general, for example, the reactor systems and methods described herein can be used in connection with liquids and/or gases having a wide range of fluid properties, such as a wide range of viscosities, densities and/or dielectric constants (each such property being considered independently or collectively as to two or more thereof). For example, liquid fluids may generally have viscosities ranging from about 0.1 cP to about 100,000 cP, and/or can have densities ranging from about 0.1 g/cm$^3$ to about 20 g/cm$^3$ and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 g/cm$^3$ and/or can have a dielectric constant ranging from about 1 to about 1.1.

The bulk material may include relatively pure gaseous elements (e.g., gaseous nitrogen, gaseous ethylene). Other components can include relatively pure liquid, solid, or gaseous compounds (e.g., liquid or solid catalyst, gaseous monomer, air). The various systems of the inventions may also include single-phase or multi-phase mixtures of gases, solids and/or liquids, including for example: two-phase mixtures of solids and gases (e.g., fluidized bed systems), mixtures of gases with a single type of particle, mixtures of gases with different types of particles (e.g., polymer and catalyst particles); and/or three-phase mixtures of gases, liquids and solids (e.g., fluidized bed with liquid catalyst being added). Particular examples of preferred fluids are described herein, including in discussion below regarding preferred applications of the methods and devices of the invention.

As noted above, oxygen in a fluidized bed polymerization system tends to function as a catalyst "poison" that terminates polymerization and slows the polymer production rate.

In generally preferred embodiments of the present invention, the amount of oxygen fed to the reactor system should maintain in the fluidized bed reactor system about a minimum effective amount of oxygen necessary to minimize fouling of the fluidized bed reactor system, while exhibiting an insignificant effect on the product properties or catalyst productivity.

In preferred embodiments of the present invention, the feed rate of the oxygen is set to about a predetermined ratio of a feed rate of a monomer. The feed rate of the oxygen may be fixed, or may vary with the feed rate of the monomer to maintain the predetermined ratio of feed rate of the oxygen to the feed rate of the monomer.

Typically, the oxygen is fed to the fluidized bed reactor system at a rate equivalent to about or less than 0.1 parts per million volume (ppmv) of oxygen ($O_2$) relative to a volumetric rate of the monomer added to the fluidized bed reactor system, such as 0.09, 0.075, 0.05, 0.04, 0.03, 0.02, 0.01, 0.005 ppmv, etc. Preferably, the oxygen is fed to the fluidized bed reactor system at about or less than about 0.05 ppmv, and more preferably about or less than about 0.025 ppmv.

In a class of embodiments, the amount of oxygen needed is small enough to have negligible effect on product properties and catalyst productivity. In one embodiment, a concentration of oxygen is equivalent to about or less than about 0.05 ppmv of oxygen relative to a volumetric rate of the monomer added to the fluidized bed reactor system, preferably less than about 0.03 ppmv oxygen. In an illustrative embodiment, oxygen is fed to the fluidized bed reactor system at a rate from about 0.005 to about 0.03 ppmv of oxygen relative to a volumetric rate of the monomer added to the fluidized bed reactor system.

The selected amount of oxygen may depend to some extent on the catalyst selected and the operating temperature. In one approach, a chromium oxide-based catalyst reduced with DEAlE is used to provide a desired product. The amount of oxygen added to the reactor system to reduce or prevent fouling in this embodiment may be considered a function of the type of catalyst in certain embodiments.

Catalyst Systems

Useful catalysts and catalyst systems useable in various aspects of the invention include chromium containing and chromium oxide-based catalysts as discussed herein.

It is however desired that any catalytic system used perform well during operation at high space-time yield (i.e., operation maximizing the rate of polymer produced per unit of reactor volume). For example, chromium oxide-based catalysts generally possess adequate productivity and activity as discussed in more detail herein.

In particular, ethylene polymers having broad molecular weight distributions may be obtained by use of a chromium oxide-based catalyst obtained by calcining a chromium compound carried on an inorganic oxide carrier in a non-reducing atmosphere to activate it such that at least a portion of the carried chromium atoms is converted to hexavalent chromium atoms ($Cr^{+6}$). The chromium compound is disposed onto silica, fluidized, and heated in the presence of oxygen from about 400° C. to 860° C., converting chromium to the $^{+6}$ oxidation state. Chromium oxide catalysts possess adequate productivity and activity.

Bis-triphenyl silyl chromate on silica (SC catalysts) are one type of inorganic oxide-supported Cr catalyst. SC-type catalysts may be reduced with aluminum alkyl-type compounds, such as DEAlE, during a catalyst preparation step prior to addition to the reactor. Such catalysts produce polyethylene with desirable broader molecular weight distribution. Chromium oxide-on-silica catalysts reduced with aluminum alkyl-type compounds such as DEAlE represent one pathway to improved catalyst systems for polyethylene having characteristics of those typically formed using silylchromate-on-silica catalysts.

A chromium oxide-based catalyst reduced with such a reducing agent will have certain properties based on, among other things, the molar ratio of reducing agent to chromium.

Information about these and other types of catalysts as well as characteristics of the polymer products formed may be found in U.S. Pat. No. 6,989,344.

In an embodiment, a chromium oxide-based catalyst used for high density polyethylene applications includes a chromium oxide disposed on dehydrated silica and subsequently reduced with DEAlE to provide polyethylene with a broader molecular weight distribution.

In general, where chromium oxide catalyst reduced with DEAlE is used to produce polyethylene, the higher the DEAlE/Cr molar ratio, the lower the molecular weight. Lower temperature broadens the molecular weight distribution of the polymer. Lower reactor temperature may also limit the production rate of a reactor because of reactor cooling limitations. The higher the DEAlE/Cr ratio, the lower the productivity of the reactor system. Thus, the DEAlE/Cr ratio of the catalyst in conjunction with the operating temperature greatly determine the product characteristics and production rates.

The molar ratio of reducing agent to chromium may be selected in order to minimize the amount of oxygen needed to reduce fouling adequately in the reactor system, while simultaneously providing the desired product molecular weight and distribution and high production rate at an optimal operating temperature.

In one approach, a chromium oxide-based catalyst that has been reduced with DEAlE is selected based on a desired property of the polymer and the operating temperature of the reactor system or portion thereof.

In another approach, a chromium oxide-based catalyst that has been reduced with DEAlE is selected based on a desired polymer of the polyolefin, the operating temperature of the reactor system or portion thereof, and a desired feed rate of oxygen.

In a class of embodiments, preferred catalysts may have a DEAlE/Cr molar ratio from about 0.1 to about 10, alternatively from about 1 to about 8. In an embodiment, one range of catalyst formulations has a DEAlE/Cr molar ratio from about 2 to about 6. In another embodiment, a molar ratio of DEAlE/Cr is less than about 2. In yet another embodiment, the molar ratio of DEAlE/Cr is less than about 1.

Operating Conditions

The operating conditions of the reactor and other systems are not narrowly critical to the invention in some embodiments. While general operating conditions have been provided for some embodiments, the process conditions may vary widely including varying temperature, pressure, fluid flowrate, etc.

For example, higher operating temperatures generally allow a higher maximum production rate. Therefore, in a class of embodiments, the invention uses a high operating temperature in order to obtain a high production rate. A catalyst may be selected to produce a desired product at the selected optimum temperature. The amount of oxygen is selected as set forth herein.

As mentioned above, preferred embodiments operate at an optimum temperature to maximize the production rate. The optimum operating temperature, of course, is a relative term, as the temperature at various points in the reactor system will be different. Therefore, the optimum operating temperature may be based on a temperature in the fluidized bed, in a recycle stream (before or after the heat exchanger), etc. The optimum operating temperature may also be based on an average of preferred temperatures at various points in the system.

Considerations when selecting the optimum temperature include functionality of the catalyst at a given temperature, the melting point of the polymer product, etc.

In generally preferred embodiments, the optimum temperature will fall within the ranges provided above.

With further reference to FIGS. 1 and 2 in an embodiment, one or more oxygen feed lines 40 are present to allow injection of oxygen into the reactor system 100.

In general, as noted above, the particular oxygen feed system of the methods and systems and apparatus of the present invention is not limited. Generally, the oxygen feed lines 40 are coupled to a master feed line 152 that is in turn coupled to a source of oxygen (not shown).

The source of oxygen may be a tank 160 containing pure or substantially pure oxygen. More typically, the oxygen is diluted in an inert gas such as Ar, $N_2$, etc. Generally, the more dilute the oxygen, the greater the control the system or operator will have over the quantity of oxygen added to the system.

The amount of oxygen added may be controlled by processing unit 50 in cooperation with flow control valves 154 in communication with the processing unit 50, as discussed more fully below.

With further reference to FIGS. 1 and 2 in an embodiment, the oxygen feed lines 40 can be placed in many different positions along or in the system containing the bulk material.

In certain embodiments, it is advantageous to insert an oxygen feed line 40 into the system just prior to the point at which fouling is desired to be reduced.

In the fluidized bed polymerization reactor system 100 of FIG. 1, for example, some oxygen feed lines, e.g., 40-1, 40-2, 40-3, 40-4, 40-5, 40-6, 40-7 inject oxygen into the reactor vessel 110. Other oxygen feed lines e.g., 40-8, 40-9, 40-10, 40-11 can be positioned at virtually any position along the recirculation system.

In particularly preferred embodiments, an oxygen feed line 40 is located between the reaction vessel 110 and the heat exchanger 124 upstream of the reaction vessel 110. This positioning is believed to provide targeted reduction of fouling of the distribution plate 128 in some embodiments.

In other particularly preferred embodiments, an oxygen feed line 40 is located between either the reaction vessel 110 and the heat exchanger 124 or between the compressor 130 and the heat exchanger 124. This positioning is believed to provide targeted reduction of fouling in the heat exchanger 124, which is particularly important where elevated operating temperatures are being used, and noting that the recycle gas exits the compressor 130 at a higher temperature than it has when it enters the compressor 130 in some embodiments.

The oxygen feed line may also connect directly to the monomer feed line to the reaction system.

As mentioned above, while the flow control valve 154 is described above and below in terms of being coupled to an external processing unit 50, the circuitry may also be implemented with the flow control valve 154 in a single standalone unit. As an example, the flow control valve 154 may comprise a flow meter, a signal processing circuit, and/or a data retrieval circuit.

As noted above, the rate of introduction of oxygen into the reactor system may be relative to a flow rate of the monomer (s), e.g., ethylene. Accordingly, in one approach, during steady-state operations, the processing unit receives a signal from the flow meter 51 on the ethylene feed line 111, calculates the proper amount of oxygen to add to the system, and adjusts one or more of the flow control valves 154 accordingly.

In another embodiment, the processing unit 50 may adjust the flow rate of oxygen into the system based on the output of a flow meter or other device indicative of fouling. For instance, as fouling occurs in a shell and tube heat exchanger, the pressure drop across it increases and/or the heat transfer coefficient diminishes.

Polymer Products

Polyolefins that may be produced according to the invention include, but are not limited to, those made from olefin monomers such as ethylene and one other, linear or branched, alpha-olefin monomers containing 3 to about 20 carbon atoms. Homopolymers or interpolymers of ethylene and other alpha-olefin monomers, with densities ranging from about 0.860 to about 0.970 g/cc may be made. Suitable higher alpha-olefin monomers include, for example, propylene, 1-butene, 1-pentene, 1-hexene, 4-methyl-1-pentene, and 1-octene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, high density polyethylene, medium density polyethylene (including ethylene-butene copolymers and ethylene-hexene copolymers), homopolymer polyethylene, polypropylene, ethylene/propylene rubber (EPR), ethylene/propylene/diene terpolymers (EPDM), polybutadiene, polyisoprene and the like.

It should be kept in mind that various steps performed in the methodology presented herein may be performed in any combination in each of the various combinations and permutations of the present invention.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Examples 1 and 2 provide illustrative methods for preparation of chemically-reduced chromium oxide-based catalysts. In comparative Examples 3 and 4, fouling of the cooler and distribution plate is characterized under polymerization conditions at which no oxygen is fed to the reactor system. Examples 5 and 6 illustrate the effect on fouling when oxygen is fed to the reactor system.

Example 1

Preparation of DEAlE-Reduced Chromium Oxide-Based Catalyst

In an illustrative method for chemically reducing chromium oxide-based catalyst, presented by way of example only, 3 grams of 957HS silica support containing 0.5 wt % Cr, from Grace Davison segment of W. R. Grace and Co., was activated with air at 600° C. The activated catalyst was placed in a 50-mL flask with a stir bar under inert atmosphere. Thirty-five mL of dry degassed hexane was added and the mixture was heated to 50° C. The reducing agent DEAlE was then added via syringe (all reagents are 20-25 wt % in hexane) at the desired reducing agent/chromium ratio. After 30 minutes, drying was commenced. Drying can be done under high vacuum or with a nitrogen purge. Catalyst was stored under nitrogen until used. Information about the catalysts produced by this method is found in U.S. Pat. No. 6,989,344.

Example 2

Preparation of DEAlE-Reduced Chromium Oxide-Based Catalyst

In another illustrative method for chemically reducing chromium oxide-based catalyst, presented by way of example only, 3 grams of C35100 MS silica support containing 0.5 wt % Cr, from PQ Corporation, was activated with air at 600° C. The activated catalyst was placed in a 50-mL flask with a stir bar under inert atmosphere. Thirty-five mL of dry degassed hexane was added and the mixture was heated to 50° C. The reducing agent DEAlE was then added via syringe (all reducing agents are 20-25 wt % in hexane) at the desired reducing agent/chromium ratio. After 30 minutes, drying was commenced. Drying can be done under high vacuum and/or with a nitrogen purge. Catalyst was stored under nitrogen until used. Information about the catalysts produced by this method is found in U.S. Pat. No. 6,989,344.

Comparative Example 3

No Oxygen Fed

Polyethylene products were made in a gas-phase, fluidized-bed reactor with chromium oxide catalysts reduced with DEAlE. An example of the catalyst preparation is shown in Example 1. The fluidized bed operated at a superficial gas velocity (SGV) of 1.75 ft/s. For the different products made, reactor temperature ranged from 93° to 103° C. Reactor pressure was 360 psig. An ethylene partial pressure of 200 psi was maintained. The molar ratio of hydrogen to ethylene in the cycle gas was maintained at 0.05. The molar ratio of 1-hexene to ethylene in the cycle gas was varied in order to make products with resin densities ranging from 0.940 to 0.952 g/cm³.

Products were made with Flow Index ($I_{21}/I_2$) [ASTM D-1238] ranging from 5 to 22 dg/min. In order to achieve the desired Flow Index, catalysts with an appropriate molar ratio of DEAlE/Cr were selected. The DEAlE/Cr ratios used varied from 2 to 5. No oxygen was added to the reactor.

Fouling within the reactor system was monitored by measuring pressure drops across the cooler and across the gas distribution plate. An increase in pressure drop during a period in which the SGV was constant indicates an increase in fouling.

One day after operation with the DEALE-reduced chromium oxide catalyst began, fouling of the distribution plate was indicated. Over a nine-day period in which SGV was either constant or slowly decreasing, the pressure drop across the distribution plate increased at an average rate of 0.33 psi/day. During this same period, pressure drop across the cooler increased at a slower rate, 0.15 psi/day.

Comparative Example 4

No Oxygen Fed

Similar polyethylene products to those in Example 3 were again made in a fluidized-bed reactor. Preparation of the catalysts used is exemplified by Example 2. The SGV in the polymerization reactor was 1.75 ft/s. Reactor temperature was varied from 95° to 105° C. Reactor pressure was 360 psig. Ethylene partial pressure was maintained at 200 psi and molar ratio of hydrogen to ethylene in the cycle gas was 0.05. The feed rate of 1-hexene was adjusted for different products for which the resin density ranged from 0.938 to 0.954 g/cm³. Flow Index of the products ranged from 8 to 40 dg/min. The DEAlE/Cr ratios on the catalysts for production of these products ranged from 5.1 to 8.4. No oxygen was fed to the reactor.

One and a half days after commencement of the reactor, pressure drop across the distribution plate began to increase. The pressure drop steadily increased over 14.5 days at an average rate of 0.35 psi/day. Fouling of the cooler did not change appreciably for the first 10 days of operation with the DEAlE-reduced chromium oxide catalysts. However, pressure drop increased rapidly over the next two days and remained high.

Example 5

Control of Fouling with Oxygen

Polyethylene products were made in a fluidized-bed reactor using DEAlE-reduced chromium catalysts. The catalysts were prepared like those in Example 2, with the following differences. The chromium-impregnated support was C35300 MS from PQ Corporation. Catalysts were activated at either 600° or 800° C. Reduction of the catalysts resulted in DEAlE/Cr molar ratios ranging from 2.8 to 5.1.

Reactor pressure was 360 psig and reactor temperature was 99° C. Ethylene partial pressure was 200 psi and the molar ratio of hydrogen to ethylene was held at 0.05. The molar ratio of 1-hexene to ethylene in the cycle gas ranged from 0.0031 to 0.0082, producing polyethylene with resin densities ranging from 0.945 to 0.952 g/cm³. Flow Index for the products made ranged from 6 to 12 dg/min.

At the time that one of these catalysts was first introduced to the reactor, there was already considerable fouling in the system. The SGV was initially 1.6 ft/s; it eventually dropped to 1.15 ft/s. After these catalysts were fed to the reactor, pressure drop across the cooler continued to increase, even as the SGV decreased. After five days of operation, feeding of oxygen was initiated downstream of the cooler. It was added at a concentration relative to the ethylene feed rate of 0.030 ppmv for 12 hours. During this period, the pressure drops across both the cooler and distribution plate stabilized.

After a 20-hour respite of no oxygen fed, feeding resumed at a concentration of 0.06 to 0.11 ppmv for three days. At this higher oxygen concentration, the SGV and pressure drops across the cooler and distribution plate each stabilized. Oxygen feed was then shut off for one day and SGV again dropped. Also, pressure drop across the cooler increased sharply but pressure drop across the distribution plate decreased. Oxygen feed was resumed at a concentration of 0.012 ppmv for 20 hours; SGV and both pressure drops stabilized.

Example 6

Control of Fouling with Oxygen

Polyethylene products were made in a fluidized-bed reactor using DEAlE-reduced chromium catalysts. The catalysts were prepared like those in Example 2, with the following differences. The chromium-impregnated support was C35300 MS from PQ Corporation. Catalysts were activated at 600° C. Reduction of the catalysts resulted in DEAlE/Cr molar ratios ranging from 3.2 to 7.1.

Reactor pressure was 360 psig. Temperature ranged from 94° to 106° C. Ethylene partial pressure was 200 psi and the molar ratio of hydrogen to ethylene was held at 0.05. The molar ratio of 1-hexene to ethylene in the cycle gas ranged from 0.004 to 0.014. SGV was steady at 1.72+/−0.02 ft/s. There was always some oxygen being fed to the reactor system; the concentration relative to ethylene feed ranged from 0.02 to 0.12 ppmv.

During 11 days of operation, fouling of the cooler and distribution plate was negligible. Increase in pressure drop across the distribution plate averaged only 0.005 psi/day. There was no change in pressure drop across the cooler.

Example 7

Effect of Oxygen on Product and Catalyst

Data from the previous examples were analyzed in order to estimate the average effect of oxygen concentration on catalyst productivity and on Flow Index of the product. The following approximate relationships were determined:

Productivity, lb polymer/lb catalyst=Constant−13800*$O_2$, ppmv ln FI=Constant+2.4*$O_2$, ppmv These examples show that feeding of oxygen at concentrations as low as less than or about 0.02 ppmv reduce fouling of the gas distribution plate and cooler dramatically when DEAlE-reduced chromium oxide catalysts are used. Furthermore, the effect of oxygen on catalyst productivity is negligible at oxygen concentrations below or at about 0.03 ppmv. In addition, the effect of oxygen on FI of the polymer is minor at oxygen concentrations below or at about 0.03 ppmv.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for producing a polyolefin, the method comprising:
    determining an optimum operating temperature for producing a polyolefin in a fluidized bed reactor system;
    selecting a chromium oxide-based catalyst that has been reduced with diethyl aluminum ethoxide (DEAlE) based on desired properties of the polyolefin achieved at the operating temperature, wherein the chromium oxide-based catalyst has been reduced with the diethyl aluminum ethoxide prior to the addition of the catalyst to the reactor and wherein the molar ratio of DEAlE/Cr in the catalyst is from about 0.1 to about 10;
    contacting a monomer with the chromium oxide-based catalyst in the fluidized bed reactor system;
    cooling a recycle stream of the fluidized bed reactor system in order to maintain the optimum operating temperature; and
    feeding oxygen to the fluidized bed reactor system to maintain in the fluidized bed reactor system an effective amount of oxygen necessary to minimize fouling of the fluidized bed reactor system,
    wherein the catalyst is a chromium oxide on dehydrated silica,
    wherein the oxygen is fed to the fluidized bed reactor system at a rate equivalent to from greater than 0 to less than 0.02 parts per million by volume of oxygen relative to a volumetric rate of the monomer added to the fluidized bed reactor system, and
    wherein the optimum operating temperature is such that a highest temperature in the fluidized bed reactor system is less than about 20° C. below a melting point of the polyolefin.

2. The method of claim 1, wherein the oxygen is fed to the fluidized bed reactor system at a rate equivalent to less than about 0.01 parts per million by volume of oxygen relative to a volumetric rate of the monomer added to the fluidized bed reactor system.

3. The method of claim 1, wherein the optimum operating temperature is such that a highest temperature in the fluidized bed reactor system is less than about 15° C. below a melting point of the polyolefin.

4. The method of claim 1, wherein the oxygen is fed to a recycle stream of the fluidized bed reactor system between a reaction vessel thereof and a heat exchanger thereof.

5. The method of claim 1, wherein the oxygen is fed to a recycle stream of the fluidized bed reactor system between a compressor thereof and a heat exchanger thereof.

6. The method of claim 1, wherein the oxygen is fed to a recycle stream of the fluidized bed reactor system between a compressor thereof and a reaction vessel thereof.

7. The method as recited in claim 1, wherein the oxygen is fed to a recycle stream of the fluidized bed reactor system upstream of a reaction vessel thereof.

8. The method of claim 1, wherein a molar ratio of DEAlE/Cr in the catalyst is from about 1 to about 8.

9. The method of claim 1, wherein the polymer is polyethylene.

10. The method of claim 1, wherein the reactor can be operated at least 3 months without requiring opening of the reactor system for cleaning.

* * * * *